US012536662B2

(12) United States Patent
Wels et al.

(10) Patent No.: US 12,536,662 B2
(45) Date of Patent: Jan. 27, 2026

(54) METHOD FOR DETERMINING A MYOCARDIAL EXTRACELLULAR VOLUME FRACTION, PROCESSING SYSTEM, MEDICAL IMAGING DEVICE, COMPUTER PROGRAM AND COMPUTER-READABLE STORAGE MEDIUM

(71) Applicant: Siemens Healthineers AG, Forchheim (DE)

(72) Inventors: Michael Wels, Bamberg (DE); Suha Ayman, Bengaluru (IN); Max Schoebinger, Hirschaid (DE); Thomas Allmendinger, Forchheim (DE); Ernst Klotz, Uttenreuth (DE); Bernhard Schmidt, Fuerth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 285 days.

(21) Appl. No.: 18/457,736

(22) Filed: Aug. 29, 2023

(65) Prior Publication Data

US 2024/0070866 A1 Feb. 29, 2024

(30) Foreign Application Priority Data

Aug. 30, 2022 (EP) .................................... 22192839

(51) Int. Cl.
*G06T 7/00* (2017.01)
*A61B 6/00* (2006.01)
(Continued)

(52) U.S. Cl.
CPC ............ *G06T 7/0014* (2013.01); *A61B 6/032* (2013.01); *A61B 6/503* (2013.01); *A61B 6/5217* (2013.01);
(Continued)

(58) Field of Classification Search
CPC ......... A61B 6/032; A61B 6/481; A61B 6/482; A61B 6/503; A61B 6/5217; G06T 11/003;
(Continued)

(56) References Cited

U.S. PATENT DOCUMENTS

2004/0066881 A1 4/2004 Reddy
2005/0033143 A1 2/2005 O'Donnell et al.
(Continued)

FOREIGN PATENT DOCUMENTS

DE 102014211587 A1 12/2015
DE 102020216306 A1 6/2022
(Continued)

OTHER PUBLICATIONS

Mergen Victor et al.:Extracellular Volume Quantification With Cardiac Late Enhancement Scanning Using Dual-Source Photon-Counting Detector CT, Investigative Radiology, Jun. 2022, vol. 57, No. 6, 406-411.
(Continued)

*Primary Examiner* — Manuchehr Rahmjoo
(74) *Attorney, Agent, or Firm* — Harness, Dickey & Pierce, P.L.C.

(57) ABSTRACT

A computer-implemented method comprises: receiving a measurement data set, the measurement data set including energy resolved data based on a computed tomography scan of the patient; reconstructing a morphology preserving image data set based on a first photon-energy band or a first combination of photon-energy bands described by the measurement data set; segmenting a blood pool within a myocardium in the morphology preserving image data set; reconstructing a contrast agent map based on a second photon-energy band or a second combination of photon-energy bands described by the measurement data set; determining a reference value based on at least one pixel or voxel
(Continued)

of the contrast agent map within the segmented blood pool; and determining a respective myocardial extracellular volume fraction depending on the reference value and a value given for at least one respective pixel or voxel outside the segmented blood pool by the contrast agent map.

20 Claims, 4 Drawing Sheets (51) Int. Cl.
- A61B 6/03 (2006.01)
- A61B 6/50 (2024.01)
- G06T 7/11 (2017.01)
- G06T 11/00 (2006.01)

(52) U.S. Cl.
CPC .............. *G06T 7/11* (2017.01); *G06T 11/003* (2013.01); *A61B 6/481* (2013.01); *A61B 6/482* (2013.01); *G06T 2207/10081* (2013.01); *G06T 2207/30048* (2013.01)

(58) Field of Classification Search
CPC . G06T 2207/10081; G06T 2207/30048; G06T 7/0012; G06T 7/0014; G06T 7/11
See application file for complete search history.

(56) References Cited

U.S. PATENT DOCUMENTS

| 2006/0241412 | A1 | 10/2006 | Rinck et al. |
| 2015/0038827 | A1 | 2/2015 | Yamagata |
| 2016/0300351 | A1* | 10/2016 | Gazit .................. G06T 5/70 |
| 2022/0198655 | A1 | 6/2022 | Grimmer et al. |
| 2023/0097267 | A1 | 3/2023 | Schwemmer et al. |

FOREIGN PATENT DOCUMENTS

| JP | 2006198411 A | 8/2006 |
| JP | 2007518461 A | 7/2007 |
| JP | 2015043975 A | 3/2015 |

OTHER PUBLICATIONS

Klotz, Ernst et al. "Transfer of Anatomical Semantics from Fully to Late Enhancing Single- and Dual-Energy Computed Tomography Scans"; (2024).
Ren Liqiang et al:Simulataneous Dual-contrast Imaging of Small Bo wel with Iodine and Bismuth using Photon-counting-detector CT: A Feasibility Animal Study, Invest Radiol, 2020, 55(10), 688-694.
Abadia A.F. et al:"Myocardial extracellular vol. fraction to differentiate healthy from cardiomyopathie myocardium using dual-source dual-energy CT". J Cardiovasc Comput Tomogr 14(2) (2020) 162-167.
Treibel, Thomas A. et al. "Automatic quantification of the myocardial extracellular volume by cardiac computed tomography: Synthetic ECV by CCT" in: Journal of Cardiovascular Computed Tomography, vol. 11 issue 3, p. 221-226.
Fukukura Yoshihiko et al: "Extracellular 1-6,9-14 volume fraction determined by equilibrium contrast-enhanced dual-energy CT as a prognostic factor in patients with stage IV pancreatic ductal adenocarcinoma", European Radiology, Springer Berlin Heidelberg, Berlin/Heidelberg, vol. 30, No. 3, Nov. 14, 2019 (Nov. 14, 2019), pp. 1679-1689, XP037028184.
Lee H.-J. et al:"Myocardial Extracellular Volume Fraction with Dual-Energy Equilibrium Contrast-enhanced Cardiac CT in Nonischemic Cardiomyopathy: A Prospective Comparison with Cardiac MR Imaging", Radiology 280:1 (2016) 49-57.
Abadia Andres F. et al: "Automated Dual-energy Computed Tomography-based Extracellular Volume Estimation for Myocardial Characterization in Patients With Ischemic and Nonischemic Cardiomyopathy", Journal of Thoracic Imaging, vol. 37, No. 5, Apr. 28, 2022 (Apr. 28, 2022), pp. 307-314, XP093012260.
Kellman, P. et al. "Extracellular volume fraction mapping in the myocardium, part 2: initial clinical experience" in: J Cardiovasc Magn Reson 14, 64 (2012). https://doi.org/10.1186/1532-429X-14-64.
Abadia Andres et al: "Automated Dual-energy Computed Tomography-based Extracellular Volume Estimation for Myocardial Characterization in Patients With Ischemic and Nonischemic Cardiomyopathy—PubMed", Apr. 28, 2022 (Apr. 28, 2022), XP093012826, Retrieved from the Internet: URL:https://pubmed.ncbi.nlm.nih.gov/35475983/.
Oda S. et al:"Myocardial Late Iodine Enhancement and Extracellular vol. Quantification with Dual-Layer Spectral Detector Dual-Energy Cardiac CT", Radiology: Cardiothoracic Imaging 2019.
Jerosch-Herold M. et al. "Cardiac magnetic resonance imaging of myocardial contrast uptake and blood flow in patients affected with idiopathic or familial dilated cardiomyopathy" in: Am J Physiol Heart Circ Physiol. Sep. 2008;295(3):H1234-H1242. doi: 10.1152/ajpheart.00429.2008. Epub Jul. 25, 2008.
Y. Zheng et al., "Four-chamber heart modeling and automatic segmentation for 3-d cardiac ct volumes using marginal space learning and steerable features," IEEE Transactions on Medical Imaging, vol. 27;No. 11; pp. 1668-1681, 2008.; 2008.
Klotz, Ernst et al. "Technical prerequisites and imaging protocols for CT perfusion imaging in oncology" in: European Journal of Radiology, vol. 84 issue 12, p. 2359-2367.
Kurita, Yoshie et al. "Estimation of myocardial extracellular volume fraction with cardiac CT in subjects without clinical coronary artery disease: A feasibility study", in: Journal of Cardiovascular Computed Tomography, vol. 10 issue 3, p. 237-241.
Kurita Y, et al. "Data on correlation between CT-derived and MRI-derived myocardial extracellular volume" Data in Brief, vol. 7, 2016, pp. 1045-1047, ISSN 2352-3409, https://doi.org/10.1016/j.dib.2016.03.073.
Moon, J.C. et al. "Myocardial T1 mapping and extracellular volume quantification: a Society for Cardiovascular Magnetic Resonance (SCMR) and CMR Working Group of the European Society of Cardiology consensus statement" in: J Cardiovasc Magn Reson 15, 92 (2013). https://doi.org/10.1186/1532-429X-15-92.

* cited by examiner

METHOD FOR DETERMINING A MYOCARDIAL EXTRACELLULAR VOLUME FRACTION, PROCESSING SYSTEM, MEDICAL IMAGING DEVICE, COMPUTER PROGRAM AND COMPUTER-READABLE STORAGE MEDIUM

CROSS-REFERENCE TO RELATED APPLICATION(S)

The present application claims priority under 35 U.S.C. § 119 to European Patent Application No. 22192839.3, filed Aug. 30, 2022, the entire contents of which is incorporated herein by reference.

FIELD

One or more example embodiments of the present invention concern a computer-implemented method for determining at least one myocardial extracellular volume fraction for a patient. Additionally, one or more example embodiments of the present invention concern a processing system, a medical imaging device, a computer program and/or a non-transitory computer-readable storage medium.

BACKGROUND

Interstitial myocardial fibrosis is an important disease process that has been associated with different kinds of cardio myopathy. The myocardial extracellular volume fraction (ECV) increases in the case of diffuse myocardial fibrosis or infiltrates and is therefore considered as a distinguishing feature of myocardial pathologic findings for cardiomyopathies.

The myocardial extracellular volume fraction can be determined in magnetic resonance imaging by determining the equilibrium distribution of gadolinium contrast agent between the myocardium and the blood. As iodine-based computed tomography contrast agents exhibit similar kinetics as gadolinium, the myocardial extracellular volume fraction can also be determined using computed tomography.

In principle, normal single energy computed tomography scans can be used for this purpose. In this case, it is however necessary to perform a baseline native scan without contrast agent, a normal coronary computed tomography angiography scan using contrast agent and a so-called late enhancing scan that is recorded several minutes after the contrast agent injection and depicts an equilibrium distribution of the contrast agent in which the contrast agent has already entered the intercellular volume of the myocardium. The use of three separate scans leads to relatively high x-ray-exposure of the patient and requires a registering of scans acquired at different times, which can lead to artefacts and therefore less exact results.

A notable improvement can be achieved when dual energy computed tomography is used. Since the x-ray-absorption is determined for different photon-energy bands in a dual energy computed tomography, different materials can be distinguished by analyzing the photon-energy dependent x-ray-absorption. When using such a dual energy acquisition, an, e.g., iodine-based contrast agent can be selectively imaged, therefore providing a contrast agent map. On the other hand, it is also possible to map water and therefore essentially tissue from the same dual energy scan. When a segmentation of a myocardium, e.g., of the myocardium of the left ventricle, and of a blood pool, especially of the blood pool within the myocardium, is known, the myocardial extracellular volume fraction can be determined from such a contrast agent map using the following formular:

$$EVC_{CT} = (1-h) \cdot \frac{\Delta HU_t}{\Delta HU_b},$$

wherein $\Delta HU_t$ is the change of x-ray absorption expressed in Hounsfield units due to the presence of the contrast agent in the tissue of the myocardium that can be directly taken from the contrast agent map, and wherein $\Delta HU_b$ is the change of x-ray absorption expressed in Hounsfield units due to the presence of the contrast agent in the blood pool that can also be taken from the contrast agent map. The variable h represents the hematocrit value for the patient that can, e.g., be known from patient data, determined via a blood test or calculated from computed tomography data.

Approaches for using dual energy computed tomography for determining the myocardial extracellular volume fraction are well known, e.g., from the publications Lee, H.-J., et al.: Myocardial Extracellular Volume Fraction with Dual-Energy Equilibrium Contrast-enhanced Cardiac CT in Nonischemic Cardiomyopathy: A Prospective Comparison with Cardiac MR Imaging. Radiology 280:1 (2016) 49-57; Abadia, A. F., et al.: Myocardial extracellular volume fraction to differentiate healthy from cardiomyopathic myocardium using dual-source dual-energy CT. J Cardiovasc Comput Tomogr 14(2) (2020) 162-167; Oda, S., et al.: Myocardial Late Iodine Enhancement and Extracellular Volume Quantification with Dual-Layer Spectral Detector Dual-Energy Cardiac CT. Radiology: Cardiothoracic Imaging 2019.

A possible approach for determining the hematocrit value directly from computed tomography data is given by Treibel, T. A., et al.: Automatic quantification of the myocardial extracellular volume by cardiac computed tomography: Synthetic ECV by CCT. J Cardiovasc Comput Tomogr 11(3) (2017) 221-226.

In principle it is possible to perform an automatic segmentation of e.g., the blood pool within the left ventricle and the myocardium of the left ventricle. An exemplary approach for such an automatic segmentation is given in Zheng, Y., et al.: Four-chamber heart modeling and automatic segmentation for 3-D cardiac CT volumes using marginal space learning and steerable features. IEEE Trans Med Imaging 27(11) (2008) 1668-81.

SUMMARY

Known segmentation algorithms for the myocardium and the blood pool perform poorly when applied to a contrast agent map. Therefore, the discussed approaches for determining a myocardial extracellular volume fraction based on dual energy computed tomography either require manual segmentation of the image data or the acquisition of an additional scan used for an automatic segmentation, that is preferably performed at a time relatively shortly after the contrast agent injection. E.g., a complete computed tomography angiography sequence can be performed or at least the scan comprising contrast agent essentially only in the blood vessel can be used as an additional scan. In this case it is however still necessary to register at least two scans taken at different times and the x-ray-exposure of the patient is increased over the use of a single scan.

One or more example embodiments of the present invention are therefore based on the problem of providing an improved approach for determining at least one myocardial extracellular volume fraction for a patient, that especially avoids the necessity of manual segmentation, even when using only a single computed tomography scan.

At least this problem is solved by a computer-implemented method for determining at least one myocardial extracellular volume fraction for a patient, comprising the steps of:
receiving a measurement data set, wherein the measurement data set comprises energy resolved data based on a computed tomography scan of the patient,
reconstructing a morphology preserving image data set based a first photon-energy band or a first combination of photon-energy bands described by the measurement data set,
segmenting a blood pool within a myocardium in the morphology preserving image data set,
reconstructing a contrast agent map based a second photon-energy band or a second combination of photon-energy bands described in the measurement data set,
determining a reference value based on at least one pixel or voxel of the contrast agent map within the segmented blood pool, and
determining a respective myocardial extracellular volume fraction depending on the reference value and the value given for at least one respective pixel or voxel outside the segmented blood pool by the contrast agent map.

When resolving multiple, preferably at least three, photon-energy bands, that can also be called energy bins, it is possible to generate different image impressions by using different energy bands and/or different combinations of energy bands during reconstruction. To combine energy bands, it is e.g., possible to add or subtract images reconstructed from different energy bands. Two of the possible impressions are the previously discussed contrast agent map and the mapping of tissue or water. Such a material contrast is caused by the fact that most contrast agents, especially iodine, have an x-ray-absorption that strongly depends on the photon-energy. Therefore, a contrast agent map can, e.g., be determined from the difference in absorption in different photon-energy bands. Once the absorption due to the contrast agent is known, the remaining absorption can be attributed to water and tissue.

The differentiation between different materials can obviously be further improved, when differences between the x-ray absorption for more than two photon-energy bands are considered.

It was found that by selecting the right photon-energy band or the right combination of photon-energy bands, a morphology preserving image data set can be generated that allows for the use of normal segmentation algorithms that are typically used to segment image data sets acquired by coronary computed tomography angiography, and therefore especially image data sets recorded after a relatively short waiting time after injecting the contrast agent and therefore in a condition where essentially all of the contrast agent is still contained in the blood pool and essentially no contrast agent has migrated to the tissue.

The first photon-energy band or first combination of photon-energy bands is especially chosen in such a way that the contrast-to-noise-ratio for the morphological features to be segmented, especially for the blood pool and/or the myocardium, is notably higher, e.g., at least by a factor of two or three, than in the contrast agent map. As discussed in more detail below, it was found that this can especially be achieved by only or mainly considering photons with a photon-energy at the lower end of the available spectrum.

The considered myocardium and blood pool can especially be the myocardium of the left ventricle and the blood pool therein.

In classic dual- or multi-energy computed tomography acquisitions it is possible to modify an acceleration voltage or use multiple x-ray sources that generate photons with different photon-energies. Alternatively, or additionally, it is possible to use sandwich-detectors with different sensitivity bands to directly measure x-ray intensities in two or more given energy bands. In both cases intensities for the different photon-energy bands are measured by the detector.

In a photon-counting detector it is possible to at least approximately determine the photon-energy of each detected photon, since the height of a current spike generated by the detection of the respective photon depends on the photon-energy of that photon. It is therefore, e.g., possible to log each individual photon detection in each pixel of a detector with the associated photon energy and afterwards perform an essentially arbitrary binning of the events depending on the detected energy to provide multiple photon-energy bands.

As previously discussed, the presence of a contrast agent can especially be detected, when the local absorption strongly varies with the photon-energy. The contrast agent map can therefore preferably be reconstructed based on a combination of at least two, preferably more, photon-energy bands described in the measurement data set.

For the reconstruction of the morphology preserving image data set it can be sufficient to use a single photon-energy band. It is however also possible that both the morphology preserving image data set and the contrast agent map are based on a respective single photon-energy band or that they are both based on a combination of photon-energy bands. In principle it would also be possible to determine the morphology preserving image data set based on a combination of photon-energy bands while the contrast agent map is based on a single photon-energy band. The different photon-energy bands can be non-overlapping or at least one pair of the photon-energy bands can overlap.

The morphology preserving image data set and the contrast agent map are preferably three-dimensional image data sets, especially formed from a three-dimensional array of voxels. Alternatively, they can be two-dimensional image data sets, e.g., formed by an array of pixels. The measurement data set can comprise multiple projection images, e.g., a single projection image for each photon-energy band and projection angle, or it can e.g., comprise a respective event list comprising all individual photon detection events for each detector pixel and projection angle.

The image acquisition is preferably not part of the computer-implemented method and is completed before the start of the method. Alternatively, the image acquisition could be included as an additional step and the acquired image data could, e.g., be directly received from a computed tomography scanner.

Preferably, all discussed steps of the computer-implemented method are performed fully automatic. Optionally it would also be possible, to allow for a user interaction to, e.g., modify the results of certain steps. E.g., the selection of the energy band or energy bands used to reconstruct the morphology preserving image data set and/or the segmentation of the blood pool and/or the segmentation of the myocardium can be modified by a user.

Preferably, the segmentation of the blood pool and/or the myocardium or at least an initial segmentation that can then be modified by the user is however performed automatically without user interaction. During the development of embodiments of the present invention, mainly the approach for automatic segmentation for a three-dimensional cardiac computed tomography volume discussed in the initially cited paper by Y. Zheng was used. There are however a multitude of further approaches for automatically segmenting contrast enhanced images in computed tomography angiography that can typically be directly used to segment the morphology preserving image data set in embodiments of the present invention without any further modification.

The measurement data set is preferably based on a photon-counting computed tomography scan. In non-photon counting multi-energy computed tomography scans, the weight of lower energy photons in a given energy band is reduced due to the used measurement principle. This effect can be avoided in photon-counting computed tomography data sets, since each individual photon is countered and the photon energy is detected as a separate parameter of the detection. Since lower energy photons are especially relevant to conserve the morphology of the depicted heart and therefore for a robust segmentation of the myocardium and the blood pool, the use of photon-counting computed tomography scan as a base for the input data set allows for more robust morphology preservation, especially for a higher contrast-to-noise-ration in the morphology preserving image data set and therefore for a more exact and robust automatic segmentation.

The use of photon counted computed tomography also allows for an essentially free and, if needed, a dynamic selection of photon-energy bands that are used in reconstructing the morphology preserving image data set on the one hand and the contrast agent map on the other hand. The only limitation for the number of used photon-energy bands is a sufficient photon count within the respective band and a sufficient energy resolution of the detector. While classic multi-energy computed tomography is limited to two or at most three or four photon-energy bands, that are typically fixed, photon-counting computed tomography allow for the use of a larger number of bands and/or the dynamic adjustment of the position and widths of the different energy bands to provide optimum results. This can be used to further improve the contrast-to-noise-ratio in the morphology preserving image data set and/or to further improve material selectivity for the contrast agent map.

Preferably, the myocardium is segmented in the morphology preserving image data set, wherein a respective myocardial extracellular volume fraction is only determined for pixels or voxels within the segmented myocardium. Additionally, or alternatively an extracellular volume image data set can be generated that comprises the respective myocardial extracellular volume fraction for each respective pixel or voxel within the segmented myocardium and either a fixed value or a value exclusively based on the morphology preserving image data set for each pixel or voxel outside the segmented myocardium. Determining the extracellular volume fraction outside of the myocardium is typically not necessary or useful when, e.g., trying to detect myocardial fibrosis. At the same time generating and displaying such a value in the area outside the myocardium can notably lower the available contrast, especially since the initially discussed formula for calculating the extracellular volume fraction tends to lead to a maximum value in the area of the blood pool and therefore outside of the relevant area.

Using a fixed value for pixels or voxels outside the segmented myocardium can be useful to, e.g., generate a three-dimensional data set that has full transparency in those areas. Such a data set can be useful for easy viewing, to allow for a robust mapping to a two-dimensional coordinate system, e.g., using a two-dimensional polar map, and/or for generating an overlay that can be superimposed e.g., onto the morphology preserving image data set. Such a superposition allows for an easier orientation of e.g., a medical examiner within the image due to the recognizability of morphological features. In such a superposition, different color palletes can be used for a projection generated from the morphology preserving image data set and a projection generated from the extracellular volume image data set. It is e.g. possible to generate a colored image with a given pallete from the extracellular volume image data set and to superimpose this image with an image generated from the morphology preserving image data set using a gray scale pallete.

As discussed above, the alternative is a combination of these two sources of data within a single two- or three-dimensional image data set.

Alternatively or additionally, the limitation of the determination of the myocardial extracellular volume fraction to the volume actually covered by the myocardium according to the segmentation or a masking of the generated values to only leave these values can be advantageous for a statistical analysis of the myocardial extracellular volume fraction, since this analysis can then be limited to the relevant volume. Simple examples for such a statistical analysis would be the calculation of an average and/or median myocardial extracellular volume faction and/or the determination of measures describing the distribution, e.g. of a standard deviation, etc.

The reference value can be determined based on an average or median of multiple pixels or voxels, preferably based on an average or median of all pixels or voxels, of the contrast agent map within the segmented blood pool. Instead of using all the pixels or voxels of the segmented blood pool, it is also possible to discard the pixels or voxels in a given number of outer rows of pixels or voxels and therefore reduce the influence of potential segmentation errors. The use of an average or median is advantageous, since the distribution of the contrast agent in the blood is expected to be essentially homogeneous in the given region and therefore an averaging or median determination can be used to further reduce errors.

The measurement data set can comprise energy resolved data based on a computed tomography scan of the patient performed at least 2 minutes or at least 3 minutes and/or at most 6 minutes or at least 5 minutes after the beginning of a contrast agent injection. When the waiting time between the contrast agent injection and that image acquisition is too short, an equilibrium between the concentration of the contrast agent in the extracellular volume of the tissue and the blood is not yet reached, since the contrast agent did not yet have time to diffuse from the blood to the tissue. Very long wait times would on the other hand not noticeably improve the equilibrium, but typically lead to an increased noise due to a reduced overall concentration of contrast agent.

The average photon-energy in the first photon-energy band or in the first combination of photon-energy bands can be less than 70 keV or less than 50 keV. As previously discussed, the contrast-to-noise-ratio in the morphology preserving image data set can be increased, when mainly photons with a relatively low photon-energy are used. It is e.g. possible to use a single first photon-energy band centered at 40 keV. The width of the first photon-energy band or the energy spread covered by the first combination of photon-energy bands can, e.g., be less than 30 keV or even less than 10 keV.

As previously discussed, the position and width of the considered photon-energy band can essentially be freely chosen when using photon-counting computed tomography. If necessary, it is also possible to e.g. pool photon detections from multiple adjacent pixels of a detector to increase the overall photon count and therefore e.g. to allow for the use of less-wide photon-energy bands. Since the photon-energy of each individual photon can be detected in photon-counting computed tomography, it is in principle also possible to continuously vary the weighting factor of individual photon within a considered photon-energy band.

The second photon-energy band or the second combination of photon-energy bands can comprise at least one photon-energy that is higher than the highest photon-energy in the first photon-energy band or the first combination of photon-energy bands. The use of a relatively wide spread of photon-energies to determine the contrast agent map is advantageous, since a material contrast used to generate the contrast agent map mainly depends on a detection of a different absorption behavior of the contrast agent at different photon-energies. It is therefore advantageous to use absorptions at multiple photon-energy bands that are preferably spaced apart as far as possible.

The contrast agent map can be based on the second combination of photon-energy bands, wherein the second combination of photon-energy bands comprises at least one photon-energy band or at least two photon-energy bands that does or do not overlap with the first photon-energy band or any photon-energy bands of the first combination of photon-energy bands. The second combination of photon-energy bands can additionally comprise the first photon-energy band or at least one photon-energy band of the first combination of photon-energy bands. As previously discussed, it is advantageous to take into account at least two, preferably more, photon-energy bands spaced across a wide energy spectrum to determine x-ray-absorption at a multitude of photon energies and therefore clearly and robustly distinguish between different materials, especially between the contrast agent and water or tissue.

The at least one myocardial extracellular volume fraction can be determined from energy resolved data based on exactly one computed tomography scan of the patient forming the measurement data set and a provided hematocrit value, wherein no other input data besides the measurement data set and the hematocrit value is used. The use of only a single computed tomography scan avoids potential artefacts due to a registration of multiple scans. The morphology preserving image data set and the contrast agent map in the computer-implemented method according to the present invention are inherently registered to each other, since they are based on the same received measurement data set that especially represents only a single computed tomography scan. The determination is therefore more robust and less error-prone than the initially discussed approaches that require a registration of multiple computed tomography scans.

A representation of the segmented blood pool, especially of the outline of the segmented blood pool in the morphology preserving image data set, and/or a representation of the segmented myocardium, especially of the outline of the segmented myocardium in the morphology preserving image data set, can displayed for a user, wherein the user can edit the segmentation of the blood pool and/or the myocardium, whereafter the respective edited segmentation can be used to determine the reference value and/or the at least one myocardial extracellular volume fraction. While the automatic segmentation of the blood pool and the myocardium is very robust in the discussed method, the acceptance of the method can be improved when medical personal can review the results of intermediate steps and potentially modify the results if deemed necessary.

Alternatively or additionally, a user can, e.g., interactively vary the first photon-energy band or the first combination of photon-energy bands used to reconstruct the morphology preserving image data set. It would, e.g., be possible to show at least one projection image of an initially generated morphology preserving image data set and, e.g., to provide a fader or some other control that allows a use to slightly shift the used first photon-energy band until an optimum contrast is reached. Alternatively, such an optimization could be performed automatically.

Besides the discussed computer-implemented method, one or more embodiments of the present invention concern a processing system, comprising
  a first interface, configured for receiving a measurement data set, wherein the measurement data set comprises energy resolved data based on a computed tomography scan of a patient,
  a second interface, configured for providing at least one myocardial extracellular volume fraction for the patient,
  a computation unit, configured for implementing the computer-implemented method according to one of the preceding claims.

The processing system can, e.g., be part of a computed tomography scanner or of a work station used to control this scanner. Alternatively, the processing system could also be a separate work station that is not used for control of the scanner or even be implemented as a cloud-based solution.

Embodiments of the present invention also concern a medical imaging device comprising an energy resolving computed tomography scanner and a processing system according to the present invention. As previously discussed, the computed tomography scanner can preferably be a photon-counting computed tomography scanner. Alternatively, a non-photon counting multi energy computed tomography scanner can be used.

Embodiments of the present invention additionally concern a computer program comprising instructions to cause the or a processing device to execute the computer-implemented method according to the present invention.

Additionally, embodiments of the present invention concern a non-transitory computer-readable storage medium having stored thereon the computer program according to the present invention.

In particular, the features and advantages described in connection with the computer implemented method according to embodiments of the present invention can also be designed as corresponding subunits of the device according to embodiments of the present invention or of the computer program according to embodiments of the present invention. Conversely, the features and advantages described in connection with the device according to embodiments of the present invention or the computer program according to embodiments of the present invention can also be designed as corresponding process steps of the process according to embodiments of the present invention.

BRIEF DESCRIPTION OF THE DRAWINGS

Other objects and features of the present invention will become apparent from the following detailed description considered in conjunction with the accompanying drawings. The drawings, however, are only principle sketches designed solely for the purpose of illustration and do not limit the present invention. The drawings show.

DETAILED DESCRIPTION

Figure 1:
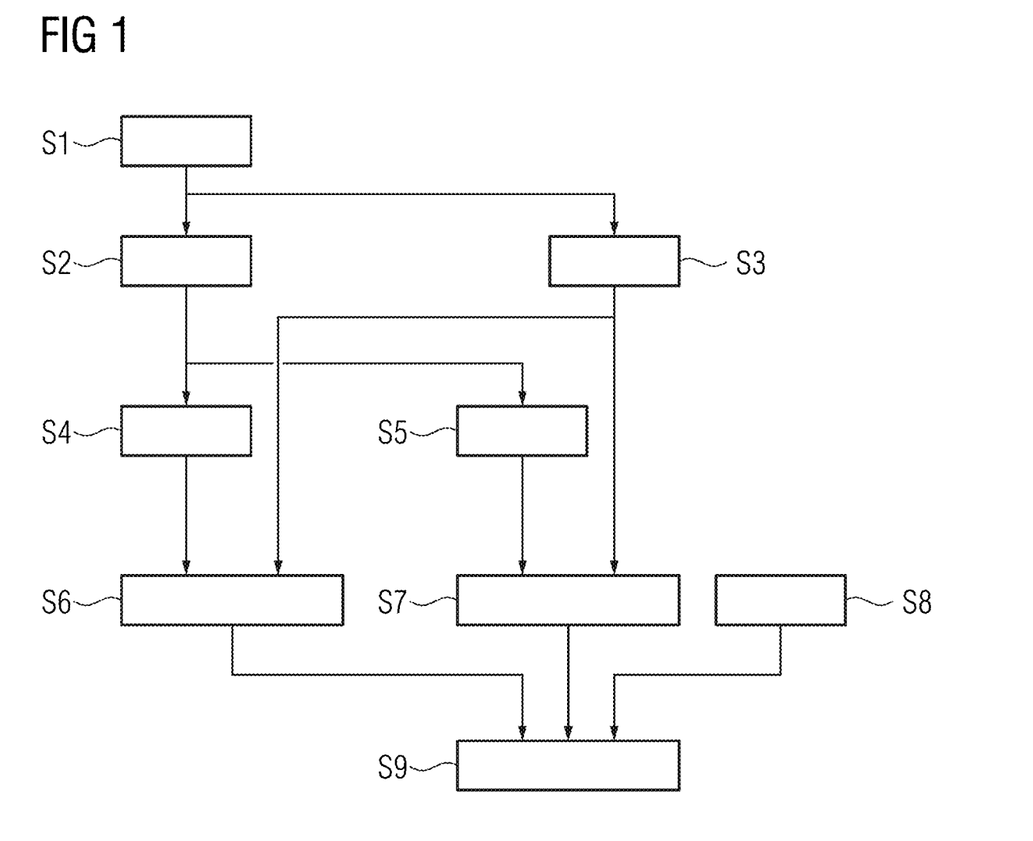
FIG. 1 is a flow chart of an exemplary embodiment of the computer-implemented method according to the present invention.

FIG. 1 shows a flow chart of a computer-implemented method for determining at least one myocardial extracellular volume fraction for a patient. The method will be discussed with additional reference to FIG. 2 that shows relevant data structures that are used in the course of the determination.

Figure 2:
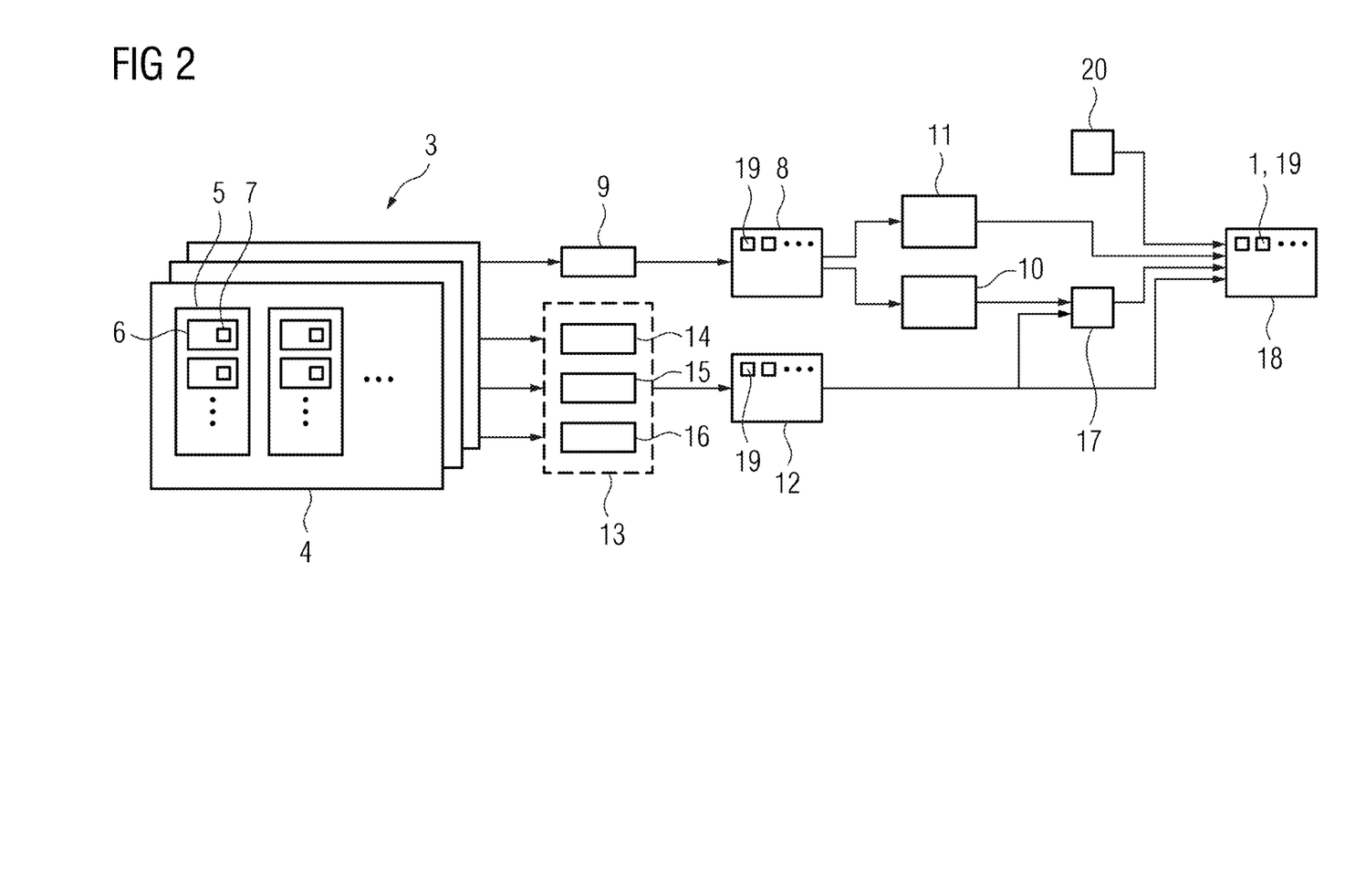
FIG. 2 is relevant data structure used in an exemplary embodiment of the computer-implemented method according to the present invention.

The central idea of the method discussed in more detail below is to use different photon-energy bands 9, 14, 15, 16 and/or combinations 13 of photon-energy bands 14, 15, 16 to generate on the one hand a morphology preserving image data set 8 and on the other hand a contrast agent map 12 from the same measurement data set 3 that comprises energy resolved data based on a computed tomography scan of a patient. The contrast agent map 12 allows for a determination of the change of x-ray-absorption in each pixel or voxel 19, especially expressed as a change in Hounsfield units, due to the presence of the contrast agent in the area of the patient depicted by the respective voxel 19. The additional use of the morphology preserving image data set 8 allows for a robust automatic segmentation of a myocardium, preferably the myocardium 11 of the left ventricle of the heart of the patient, and the blood pool 10 therein. Therefore, the change of x-ray-absorption in the blood pool 10 and the myocardium 11 can be determined and based on these values the myocardial extracellular volume fraction 1 can be calculated.

To determine the myocardial extracellular volume fraction 1 firstly a measurement data set 3 is received in step S1. The measurement data set 3 comprises energy resolved data based on a computed tomography scan of the patient. In the example, the measurement data set 3 is acquired using a photon-counting computed tomography scan. The measurement data set can be directly provided by an energy resolving computed tomography scanner or the discussed processing can happen at a later point in time and the measurement data set 3 can, e.g., be read from a data base.

The computed tomography scan to acquire the data set is preferably performed at a time at which an approximate equilibrium between the contrast agent in the blood vessels and the contrast agent in the extracellular volume fraction of the tissue is present. Such an equilibrium is typically reached approximately 3 to 5 minutes after the beginning of a contrast agent injection and therefore the scan should preferably be performed in this time frame.

Due to the use of a photon-counting detector, for each projection 4 acquired and each pixel 5 of the detector the measurement data set 3 comprises a list of a detection events 6 for the respective projection 4 and the pixel 5. Since photon-counting tomography scans allow the acquisition of a photon-energy for each detected photon, each detection event 6 also describes a measure for the photon-energy 7 of the detected photon.

Alternatively, it would be possible to provide a measurement data set 3 for which a binning of the photon-energy 7 into respective photon-energy bands is already performed. Such a measurement data set 3 could, e.g., provide respective photon counts for each energy band, pixel 5 and projection 4. Instead of a photon-counting computed tomography scan it would also be possible to use a classic multi-energy-acquisition that only provides detected intensities for each given projection 4, pixel 5 and energy band.

In Step S2 the morphology preserving image data set 8 is reconstructed. In the example the reconstruction is based only on detected photons within a given photon-energy band 9. This can, e.g., be achieved by only taken those detection events 6 in the measurement data set 3 into account, for which the given photon-energy 7 lies within the given photon-energy band 9. Any other detection events 6 are disregarded and therefore essentially discarded during the reconstruction of the morphology preserving image data set.

The count of the remaining detection events 6 for a given pixel 5 and projection 4 can then be directly considered to describe the x-ray-intensity in the given photon-energy band 9 or further processing, e.g. an energy weighting, can be applied. The result is a number of projection images that only take into consideration of photon-energies 7 within the given photon-energy band 9, that can then be used to reconstruct the morphology preserving image data set 8 using well known image reconstruction techniques, e.g. a filtered back projection or an iterative reconstruction approach.

In alternate embodiments it would also be possible, to take multiple photon-energy bands into account when reconstructing the morphology preserving image data set 8. It could, e.g., be possible to calculate counts or intensities for each pixel 5, each projection 4 and each energy band considered and then, e.g., calculate a weighted sum of the counts or intensities during the reconstruction.

If the individual detection events 6 are not available, e.g., due to a prior binning of the events based on photon-energy 7 or due to a direct detection of intensities within several energy bands, counts or intensities provided in the measurement data set 3 for the relevant photon-energy band 9 can be directly used to reconstruct the morphology preserving image data set 8.

In step S3 a contrast agent map 12 is reconstructed based on a combination 13 of multiple photon-energy bands 14, 15, 16. As previously discussed for the photon-energy band 9, photon counts or intensities for each of the energy bands 14, 15, 16, pixel 5 and projection 4 can be determined or given by the measurement data set 3. Since the material contrast for the contrast agent, e.g. for iodine, is typically based on the fact that contrast agents have an x-ray-absorption that strongly varies with photon-energy, the combination of the counts and/or intensities in the various photon-energy bands 14, 15, 16 can advantageously be more complex than a weighted sum and e.g. comprise a determination of a difference between intensities or counts for different photon-energy bands 14, 15, 16 and/or an evaluation of the relative intensity or count determined for the different photon-energy bands 14, 15, 16. The determination of a material contrast for a contrast agent, especially for iodine, based on intensities or photon-counts for multiple photon-energy bands is well known in the prior art and there is a multitude of different approaches to determine such a material contrast that is used in different existing products by various manufacturers. Therefore, the determination of a value describing the material contrast, especially of a change of Hounsfield units due to the x-ray-absorption by the contrast agent, will not be described in detail.

Concerning the different photon-energy bands 9, 14, 15, 16 used in the example, the photon-energy band 9 preferably only comprises photons with a relatively low photon-energy 7. The photon-energy band 9 can, e.g., be centered at 40 keV or 50 keV and have a width of e.g. 10 keV to 30 keV.

The photon-energy bands 14, 15, 16 are preferably spaced across the available spectrum, e.g., from 40 keV to 120 keV. It Is, e.g., possible that the photon-energy band 14 is identical to the photon-energy band 9 or partially overlaps with the photon-energy band 9. The photon-energy bands 15, 16 preferably comprise detected photons with photon-energies 7 above the photon-energy band 9 and are preferably separated from each other to describe absorptions of the contrast agent in different parts of the spectrum.

In step S4 and S5 an automatic segmentation is applied to the morphology preserving image data set 8. In step S4 the blood pool 10 is segmented and in step S5 the myocardium 11 is segmented. While these segmentations are shown at separate steps for reasons of clarity, it can be advantageous, to use a common segmentation algorithm to perform both of these segmentations at the same time.

Figure 3:
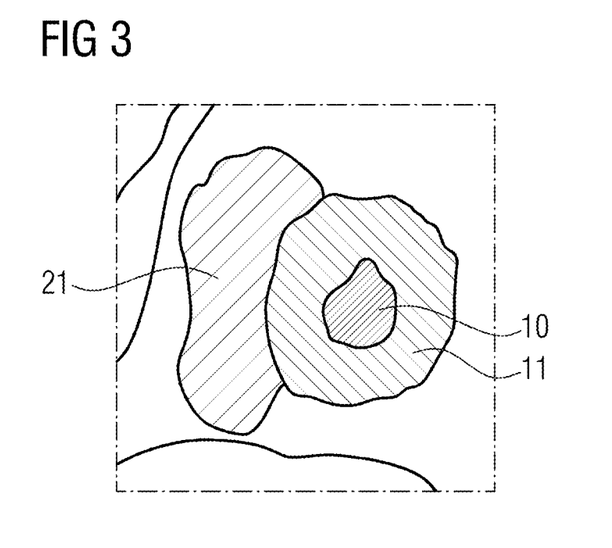
FIGS. 3 and 4 illustrate exemplary segmentations of the myocardium and the blood pool in two different views of the heart.
Figure 4:
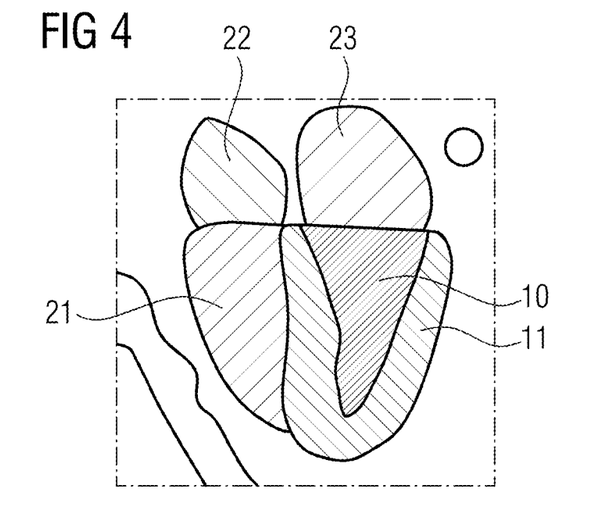

The example uses the segmentation algorithm given by the initially cited paper by Y. Zheng. In principle any segmentation algorithm for segmenting a computed tomography volume of the heart can be used. Examples of the segmentation are schematically shown in FIGS. 3 and 4, wherein FIG. 3 shows a short-axis view and FIG. 4 shows a long-axis view of the heart. The used segmentation algorithm allows an automatic segmentation of five regions of the heart in the volume depicted by the morphology preserving image data set 8. These regions are shaded in FIGS. 3 and 4. These regions are the myocardium 11 of the left ventricle, the blood pool 10 of the left ventricle, the right ventricle 21 and the left and right atrium 22, 23. Other exemplary structures are shown in FIGS. 3 and 4 but not segmented.

The segmentation of the right ventricle 21 and the left and right atrium 22, 23 is not used in the discussed example of the method and the segmentation of these areas could therefore be skipped or the segmentation can be discarded.

Since the morphology preserving image data set 8 and the contrast agent map 12 are determined from the same measurement data set and therefore from a single computed tomography scan of the patient, the contrast agent map 12 is inherently registered to the morphology preserving image data set 8 and therefore each voxel 19 of the contrast agent map 12 corresponds to the respective voxel 19 of the morphology preserving image data set 8 at the same position and describes the same area in the heart of the patient. The segmentation of the blood pool 10 and the myocardium 11 in the morphology preserving image data set 8 does therefore also describe the segmentation of the blood pool 10 and the myocardium 11 in the contrast agent map 12.

Using the segmentation of the blood pool 10, it is therefore possible to select the voxels 19 of the contrast agent map 12 that lie within the blood pool 10. Since the image data of the respective voxels shows the change of the x-ray-absorption due to the contrast agent, especially a change in Hounsfield units due to the contrast agent, by averaging the image data from these voxels 19 a reference value 17 can be determined that describes the change of x-ray-absorption in the blood pool due to the presence of the contrast agent in step S6. If this reference value 17 describes a change in Hounsfield units it can be labeled $\Delta HU_b$.

In step S7 the segmentation of the myocardium 11 is used to select those voxels 19 in the contrast agent map 12 that depict the myocardium 11 of the left ventricle. Since the image data of these voxels 19 describe the change of x-ray-absorption at the respective position in the tissue of the myocardium 11, it can be labeled $\Delta HU_t$. When these changes given in Hounsfield units, it already describes an information that is expected to be proportional to the myocardial extracellular volume faction ($EVC_{CT}$) for the area of the myocardium tissue depicted in the respective voxel 19 according to the already discussed formula $$EVC_{CT} = (1-h) \cdot \frac{\Delta HU_t}{\Delta HU_b}.$$

In step S8 the hematocrit value 20, that is labeled as h in the given formula, is provided, e.g. from a patient data record. Therefore, all terms on the right-hand side of the given formula are known and the myocardial extracellular volume fraction 1 for the given voxel 19 within the segmented myocardium 11 can therefore be calculated in step S9.

To allow for an easier representation of the determined, locally resolved myocardial extracellular volume fraction 1, an extracellular volume image data set 18 can be generated that comprises the respective myocardial extracellular volume fraction 1 for each respective voxel 19 within the segmented myocardium 11. Voxels outside the segmented myocardium 11 can be set to a fixed value, e.g., to full transparency. The extracellular volume image data set 18 can, e.g., be used to generate projections that are super imposed to corresponding projections of the morphology preserving image data set 8, especially using a different color pallete as already discussed in the general description. Since the extracellular volume image data set 18 is automatically registered to the morphology preserving image data set 8, additional registration is not necessary.

Additionally or alternatively, statistical analysis of the determined myocardial extracellular volume fraction 1 is possible. It is, e.g., possible to calculate an average or select a median from these determined fractions, to determine parameters of the distribution or to analyze a local variance of this fraction.

While the previously discussed method uses a fully automated approach for determining the myocardial extracellular volume fractions 1, it can in some used cases be advantageous when a supervising user can modify the results of certain steps. It is, e.g., possible that the segmentation of the blood pool 10 and myocardium 11 are output for user, e.g., using the views shown in FIGS. 3 and 4, and that the user can modify these segmentations. Modified segmentations can then be used in the further steps.

Figure 5:
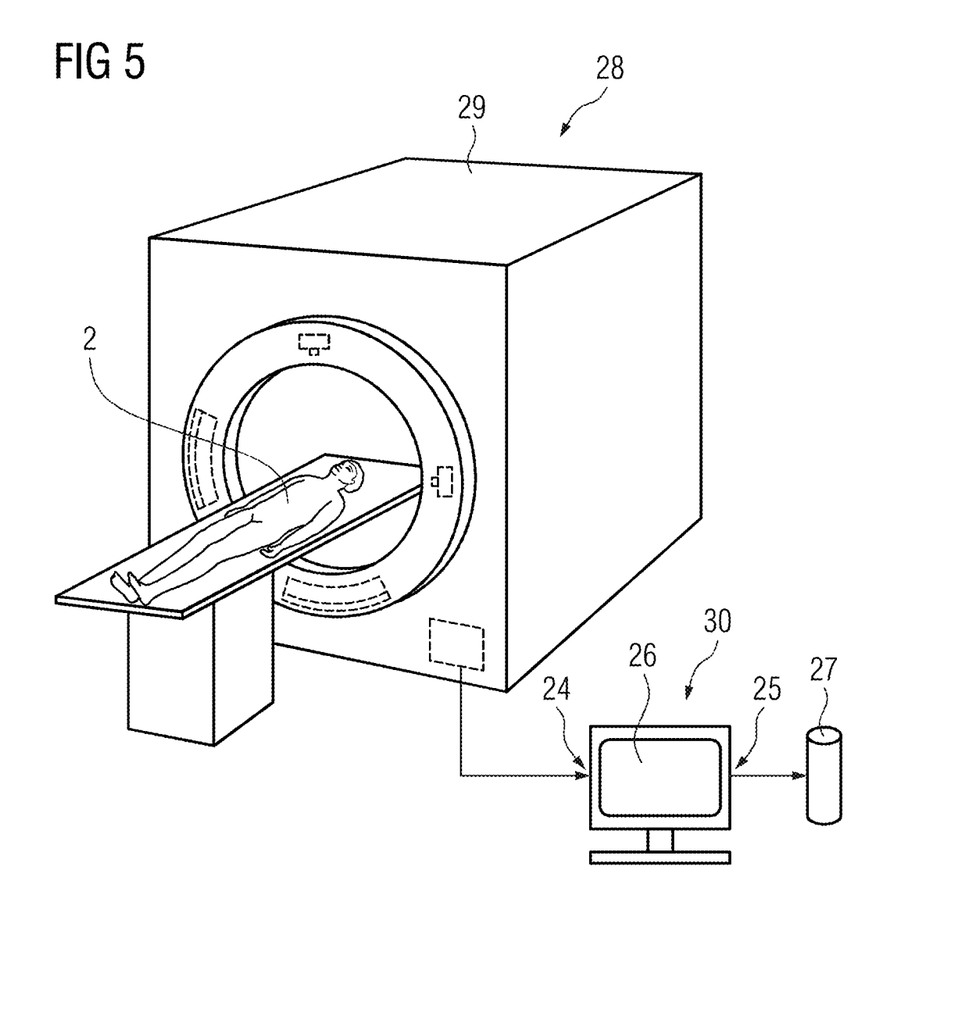
FIG. 5 illustrates an exemplary embodiment of a medical imaging device according to the present invention comprising an exemplary embodiment of a processing system according to the present invention.

FIG. 5 shows a medical imaging device 28 that comprises an energy resolving computed-tomography scanner 29, preferably a photon-counting computed tomography scanner, and a processing system 30. The processing system 30 comprises a first interface 24, configured for receiving the measurement data set 3, and a second interface 25, configured for providing the myocardial extracellular volume fraction 1, especially in the form of the extracellular volume image data set 18.

In the example the measurement data set 3 is provided by the energy resolving computed tomography scanner 29 immediately after the scanning of the patient 2. Alternatively, it would also be possible to intermediately store the measurement data set 3, either in the scanner 29 itself or, e.g., in a patient data base. The determined myocardial extracellular volume fraction 1, especially in the form of the extracellular volume image data set 18, is stored in a patient data base 27 in the example. Alternatively or additionally, information concerning the myocardial extracellular volume fraction 1 could be directly output to a user, e.g. using a screen of a processing device 26 implementing the processing system 30.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A computer-implemented method for determining at least one myocardial extracellular volume fraction for a patient, the computer-implemented method comprising:
   receiving a measurement data set, the measurement data set including energy resolved data based on a computed tomography scan of the patient;
   reconstructing a morphology preserving image data set based on a first photon-energy band or a first combination of photon-energy bands described by the measurement data set;
   segmenting a blood pool within a myocardium in the morphology preserving image data set;
   reconstructing a contrast agent map based on a second photon-energy band or a second combination of photon-energy bands described by the measurement data set;
   determining a reference value based on at least one pixel or voxel of the contrast agent map within the segmented blood pool; and
   determining a respective myocardial extracellular volume fraction depending on the reference value and a value given for at least one respective pixel or voxel outside the segmented blood pool by the contrast agent map.

2. The computer-implemented method according to claim 1, wherein the measurement data set is based on a photon-counting computed tomography scan.

3. The computer-implemented method according to claim 2, wherein at least one of
   the myocardium is segmented in the morphology preserving image data set,
   a respective myocardial extracellular volume fraction is only determined for pixels or voxels within the segmented myocardium, or
   an extracellular volume image data set is generated, the extracellular volume image data set including the respective myocardial extracellular volume fraction for each respective pixel or voxel within the segmented myocardium and either a fixed value or a value exclusively based on the morphology preserving image data set for each pixel or voxel outside the segmented myocardium.

4. The computer-implemented method according to claim 1, wherein at least one of
   the myocardium is segmented in the morphology preserving image data set,
   a respective myocardial extracellular volume fraction is only determined for pixels or voxels within the segmented myocardium, or
   an extracellular volume image data set is generated, the extracellular volume image data set including the respective myocardial extracellular volume fraction for each respective pixel or voxel within the segmented myocardium and either a fixed value or a value exclusively based on the morphology preserving image data set for each pixel or voxel outside the segmented myocardium.

5. The computer-implemented method according to claim 4, wherein the second photon-energy band or the second combination of photon-energy bands includes at least one photon energy that is higher than a highest photon energy in the first photon-energy band or the first combination of photon-energy bands.

6. The computer-implemented method according to claim 4, wherein
   the contrast agent map is based on the second combination of photon-energy bands,
   the second combination of photon-energy bands includes at least one photon-energy band that does not overlap with the first photon-energy band or any photon-energy band of the first combination of photon-energy bands.

7. The computer-implemented method according to claim 4, wherein the at least one myocardial extracellular volume fraction is determined from energy resolved data based on exactly one computed tomography scan of the patient forming the measurement data set and a hematocrit value, and wherein no other input data other than the measurement data set and the hematocrit value is used.

8. The computer-implemented method according to claim 1, wherein the reference value is determined based on an average or median of multiple pixels or voxels of the contrast agent map within the segmented blood pool.

9. The computer-implemented method according to claim 8, wherein the reference value is determined based on an average or median of all pixels or voxels of the contrast agent map within the segmented blood pool.

10. The computer-implemented method according to claim 1, wherein the measurement data set includes energy resolved data based on a computed tomography scan of the patient performed at least 2 minutes or at most 6 minutes after start of a contrast agent injection.

11. The computer-implemented method according to claim 1, wherein an average photon energy in the first photon-energy band or in the first combination of photon-energy bands is less than 70 keV or less than 50 keV.

12. The computer-implemented method according to claim 1, wherein the second photon-energy band or the second combination of photon-energy bands includes at least one photon energy that is higher than a highest photon energy in the first photon-energy band or the first combination of photon-energy bands.

13. The computer-implemented method according to claim 1, wherein
the contrast agent map is based on the second combination of photon-energy bands,
the second combination of photon-energy bands includes at least one photon-energy band that does not overlap with the first photon-energy band or any photon-energy band of the first combination of photon-energy bands.

14. The computer-implemented method according to claim 1, wherein the at least one myocardial extracellular volume fraction is determined from energy resolved data based on exactly one computed tomography scan of the patient forming the measurement data set and a hematocrit value, and wherein no other input data other than the measurement data set and the hematocrit value is used.

15. The computer-implemented method according to claim 1, wherein
at least one of a representation of the segmented blood pool or a representation of a segmented myocardium is displayed for a user,
segmentation of at least one of the blood pool or the myocardium is edited, and
a respective edited segmentation is used to determine at least one of the reference value or the at least one myocardial extracellular volume fraction.

16. A processing system, comprising:
a first interface configured to receive a measurement data set, the measurement data set including energy resolved data based on a computed tomography scan of a patient;
a second interface configured to provide at least one myocardial extracellular volume fraction for the patient; and
a computation unit configured to implement the computer-implemented method of claim 1.

17. A medical imaging device comprising:
an energy resolving computed tomography scanner; and
the processing system of claim 16.

18. A non-transitory computer-readable storage medium storing computer-executable instructions that, when executed by at least one processor at a processing system, cause the processing system to perform the computer-implemented method of claim 1.

19. The computer-implemented method according to claim 1, wherein the measurement data set includes energy resolved data based on a computed tomography scan of the patient performed at least 3 minutes or at most 5 minutes after start of a contrast agent injection.

20. The computer-implemented method according to claim 1, wherein
at least one of a representation of an outline of the segmented blood pool in the morphology preserving image data set or a representation of an outline of a segmented myocardium in the morphology preserving image data set is displayed for a user,
segmentation of at least one of the blood pool or the myocardium is edited, and
a respective edited segmentation is used to determine at least one of the reference value or the at least one myocardial extracellular volume fraction.

* * * * *